US 6,550,052 B1

(12) United States Patent
Joyce et al.

(10) Patent No.: US 6,550,052 B1
(45) Date of Patent: Apr. 15, 2003

(54) SOFTWARE DEVELOPMENT FRAMEWORK FOR CONSTRUCTING EMBEDDED VEHICLE CONTROLLER SOFTWARE

(75) Inventors: Mary Joyce, Farmington Hills, MI (US); Jesse Saier, Sterling Heights, MI (US); John Smiley, Southfield, MI (US); Bruce Dorow, Belleville, MI (US); Lawrence Cramer, Troy, MI (US); Madhu B. Banerjee, Bloomfield Hills, MI (US); William O. Robinson, Detroit, MI (US); Maura P. O'Kennedy, Royal Oak, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 09/436,853

(22) Filed: Nov. 9, 1999

(51) Int. Cl.⁷ .................................................. G06F 9/44
(52) U.S. Cl. .................... 717/100; 717/101; 700/113; 701/115
(58) Field of Search ................................. 717/100, 101, 717/107, 104; 701/24, 29, 32, 35, 56, 115, 208, 53, 36; 700/113, 118; 702/85, 152; 714/38

(56) References Cited

U.S. PATENT DOCUMENTS

| | | | | |
|---|---|---|---|---|
| 4,831,539 A | * | 5/1989 | Hagenbuch | 701/207 |
| 5,472,056 A | * | 12/1995 | Srattone et al. | 172/2 |
| 5,631,832 A | * | 5/1997 | Hagenbuch | 701/35 |
| 5,638,273 A | * | 6/1997 | Coiner et al. | 701/35 |
| 5,671,141 A | * | 9/1997 | Smith et al. | 701/1 |
| 5,710,716 A | * | 1/1998 | Boyvich et al. | 702/155 |
| 5,755,291 A | * | 5/1998 | Gengler et al. | 172/2 |
| 5,812,849 A | | 9/1998 | Nykiel et al. | 717/101 |
| 5,813,012 A | | 9/1998 | Chase et al. | 717/102 |
| 5,815,654 A | | 9/1998 | Bieda | 714/38 |
| 5,935,190 A | * | 8/1999 | Bowlds | 701/119 |
| 6,181,992 B1 | * | 1/2001 | Gurne et al. | 701/29 |
| 6,356,823 B1 | * | 3/2002 | Iannotti et al. | 701/35 |
| 6,389,383 B1 | * | 5/2002 | Sarathy et al. | 703/21 |
| 6,405,361 B1 | * | 6/2002 | Broy et al. | 717/100 |
| 6,405,366 B1 | * | 6/2002 | Lorenz et al. | 717/107 |
| 6,411,293 B1 | * | 6/2002 | Sakamoto et al. | 345/419 |
| 6,442,644 B1 | * | 8/2002 | Gustavson et al. | 711/105 |

OTHER PUBLICATIONS

Title: Strategic directions in real–time and embedded systems, author: Stankovik, ACM, 1996.*
Title: Performance Analysis of Integrated Navigation Systems, author: Brodie et al, ACM, Dec., 1985.*
Title: Modeling Concepts for Intelligent Vehicle Highway Systems (IVHS), author: Hsin et al, ACM, 1992.*

* cited by examiner

Primary Examiner—Gregory Morse
Assistant Examiner—Chameli C. Das
(74) Attorney, Agent, or Firm—Edwin W. Bacon, Jr.

(57) ABSTRACT

A computer-implemented software development system is provided for constructing applications that are embedded in a microcontroller of a motor vehicle. The development system includes a data dictionary which stores data type information for a plurality of vehicle parameters and is able to generate a parameter definition file having data type information for each vehicle parameter associated with a first application. A calibration repository is used to generate a calibratable file for the first application, where the calibratable file includes calibratable vehicle information and controller executable instructions for the first application. The parameter definition file and the calibratable file are then used by a calibration tool to calibrate the first application in relation to a particular motor vehicle.

6 Claims, 4 Drawing Sheets

CATALYST_MONITOR_PENDING_1
10 (10 breakpoints)
| | | | | |
|---|---|---|---|---|
| 00000141 | BATT_TEMP_FAULT | 00 | $1-Bit Clear | 06 |
| 00000143 | COOLANT_FAULT | 00 | $1-Bit Clear | 3E |
| 00000142 | MAP_FAULT | 00 | $1-Bit Clear | CE |
| 00000145 | TPS_FAULT | 00 | $1-Bit Clear | B9 |
| 00000144 | FAN_FAULT | 00 | $1-Bit Clear | 4E |
| 00000146 | FAN_ON | 00 | $1-Bit Clear | 76 |
| 00000149 | EGR_FAULT | 00 | $1-Bit Clear | 70 |
| 0000014D | O2_1_FAULT | 00 | $1-Bit Clear | C0 |
| 0000014C | O2_2_FAULT | 00 | $1-Bit Clear | 7E |
| 0000014F | O2_3_FAULT | 00 | $1-Bit Clear | C6 |
| 0000014E | O2_4_FAULT | 00 | $1-Bit Clear | 40 |
| 00000151 | O2_HEATER_1_FAULT | 00 | $1-Bit Clear | 13 |
| 00000150 | | 00 | N/A | FF |
| 00000153 | | 00 | N/A | FF |
| 00000152 | | 00 | N/A | FF |
| 00000154 | | 00 | N/A | FF |
| 0000FFFF | | 00 | N/A | FF |
| 0000FFFF | | 00 | N/A | FF |
| 0000FFFF | | 00 | N/A | FF |
| 0000FFFF | | 00 | N/A | FF |

Fig. 2

| | |
|---|---|
| ADDR | 4 Byte address, aligned on EVEN address |
| Chrysler Fault ID | 2 Bytes |
| PCODE | 2 Bytes |
| Task Manager Fault (Y/N) | 1 bit (set = task manager fault = yes) |
| Emissions Related Fault (Y/N) | 1 bit (set = fault is emissions related = yes) |
| Fault Enabled (Y/N) | 1 bit (set = fault enabled = yes) |
| Feature Enabled (Y/N) | 1 bit (set = feature enabled = yes) |
| Continuous (Y/N) | 1 bit (set = continuously monitored = yes) |
| # of trips to set fault (2/1) | 1 bit (set = 2 trips = yes) |
| # of trips to clear fault (3/1) | 1 bit (set = 3 trips = yes) |
| Limpin clear next keyon (Y/N) | 1 bit (set = limpin cleared next keyon = yes) |
| Limpin on 1 malfunction (Y/N) | 1 bit (set = limpin occurs on 1 malfunction) |
| MIL enable (Y/N) | 1 bit (set = MIL turned on for fault = yes) |
| Pulse MIL (Y/N) | 1 bit (set = MIL pulsed for fault = yes) |
| Alternator lamp (Y/N) | 1 bit (set = alt lamp on for fault = yes) |
| Freeze Frame Priority | 3 bits (0, 1, 2, 3, 4) |
| Sus/Pend/Conf tables (Y/N) | 1 bit (set = tables available this fault = yes) |
| Reserved #1 | 1 byte |
| Reserved #2 | 1 byte |

SOFTWARE DEVELOPMENT FRAMEWORK FOR CONSTRUCTING EMBEDDED VEHICLE CONTROLLER SOFTWARE

BACKGROUND OF THE INVENTION

1. Field of the Invention

The present invention relates generally to a computer-implemented software development framework and, more particularly, to a software development system for constructing applications that are to be embedded in one or more microcontrollers residing on a motor vehicle.

2. Discussion

Designing, developing and manufacturing automobiles is an extremely complex process that involves numerous engineering and calibration groups. Similarly, the design and development of embedded controller software for use in an automobile is a complex process that involves numerous engineering groups.

Typically, the algorithms which serve as the basis for the embedded controller software are developed by one or more engineering groups. During the course of development, numerous vehicle parameters are identified for use in the software. The nomenclature for these vehicle parameters tends to be very descriptive. The software developers then convert the algorithms into source code which serves as the basis for the object code to be embedded into the vehicle's controller. Due to software variable naming constraints provided by the particular programming language, the software variable names found on the source code and object code are not always helpful when trying to identify a vehicle parameter. For the engineers and calibrators who subsequently test, calibrate and implement the object code into the vehicle's controller, there is a need for a mapping between the descriptive vehicle parameter names and the memory location of the parameter in the object code.

In addition, vehicle parameter information for embedded controller software is typically duplicated in a multitude of files, folders or documents by each of the groups involved with the development process. In some cases, certain vehicle parameter information are not at all documented within the software development environment.

Therefore, it is desirable to provide a computer-implemented software development system for constructing applications that are to be embedded in one or more microcontrollers residing on a motor vehicle. The software development system should provide a centralized location for vehicle parameter information, eliminate redundancy in vehicle parameter storage, and standardize report formats. The present invention includes a data dictionary that has been designed and implemented to facilitate software development. More specifically, the data dictionary serves as a standard reference tool that contains information about each of the data parameters generated during the software development process. In this way, the data parameters are centralized, without duplication, for use by all of the parties involved with the development and implementation of software.

SUMMARY OF THE INVENTION

In accordance with the present invention, a computer-implemented software development system is provided for constructing applications that are embedded in a microcontroller of a motor vehicle. The development system includes a data dictionary which stores data type information for a plurality of vehicle parameters and is able to generate a parameter definition file having data type information for each vehicle parameter associated with a first application. A calibration repository is used to generate a calibratable file for the first application, where the calibratable file includes calibratable vehicle information and controller executable instructions for the first application. The parameter definition file and the calibratable file are then used by a calibration tool to calibrate the first application in relation to a particular motor vehicle.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 2 illustrates an exemplary condition code table data parameter in accordance with the present invention;

FIG. 3 illustrates an exemplary fault code array data parameter in accordance with the present invention;

DETAILED DESCRIPTION OF THE PREFERRED EMBODIMENT

Figure 1:
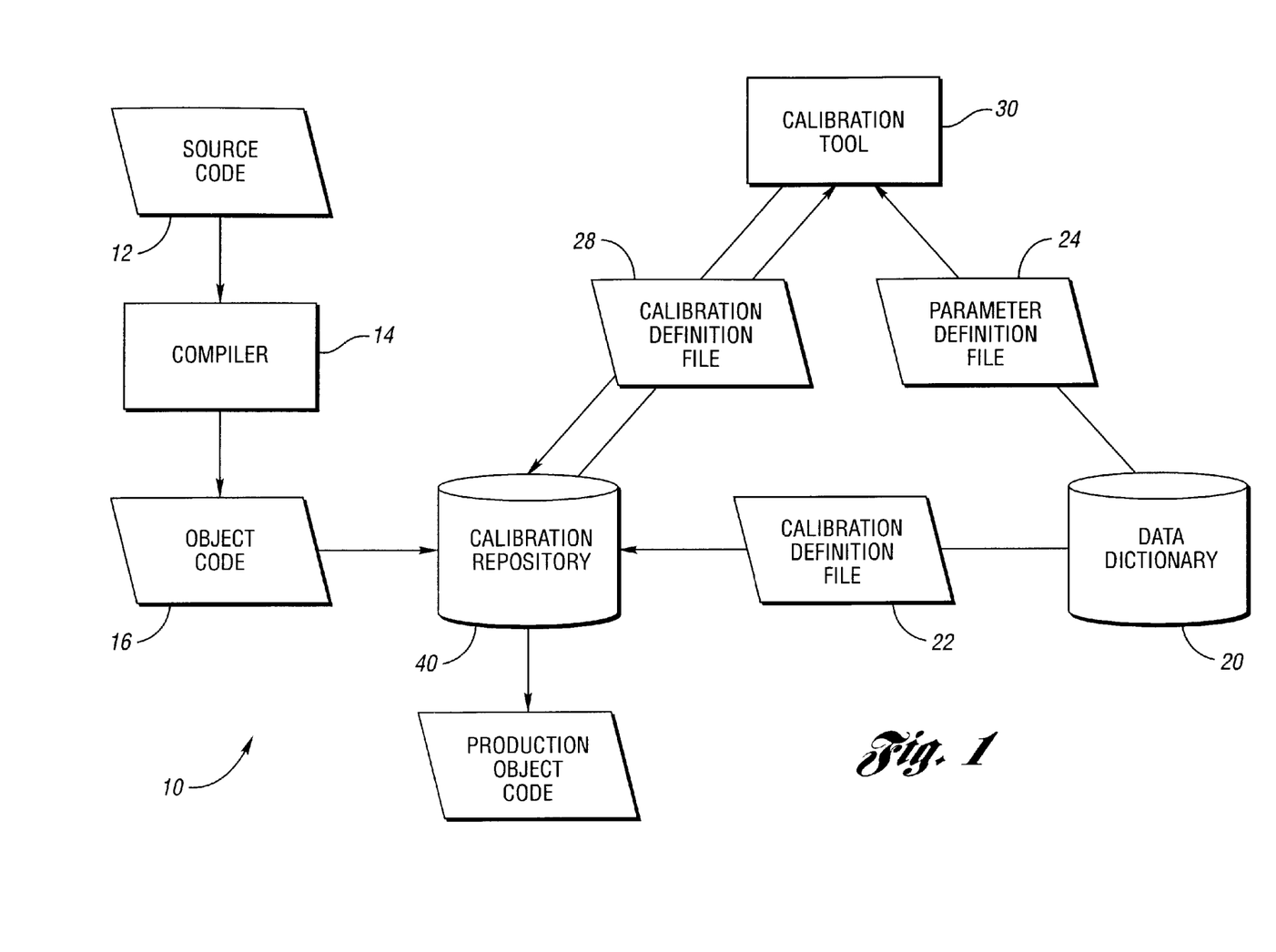
FIG. 1 is a block diagram showing the components of a computer-implemented software development system in accordance with the present invention.

A computer-implemented software development system 10 for constructing and calibrating applications that may be embedded in one or more microcontrollers of a motor vehicle is depicted in FIG. 1. Although the software development system 10 is presently used to develop and calibrate a single application for use in the engine controller of a motor vehicle, this is not intended as a limitation of the broader aspects of the present invention. On the contrary, the software development system 10 can be used to construct multiple applications which can then be embedded in the engine controller and/or other microcontrollers (e.g., transmission controller) residing on a motor vehicle.

Prior to entering the calibration stage of the software development process, source code 12 for each application is written, tested and debugged by the software developers. The software developers are confined by the vehicle parameters as defined in a data dictionary 20. Depending on the programming language used to write the source code is 12, the source code 12 is translated into object code 16 by an environment specific compiler 14. The object code 16 is then imported into a calibration repository 40. For purposes of this description, object code 16 refers to machine instructions or machine language that was translated from the source code 12 and can be directly executed by a microcontroller or other central processing unit residing on a motor vehicle.

A data dictionary, as is well known in the art, is a database that contains "data about the data". In the software development system 10, the data dictionary 20 provides a central repository for the vehicle parameters used to develop the applications which are embedded into vehicle controllers.

As will be more fully explained, the data dictionary 20 provides the implementation details for each vehicle parameter, how to use each vehicle parameter, how to access each vehicle parameter, and the way in which each vehicle parameter is stored in memory.

As part of the calibration process, the data dictionary 20 also provides a calibration definition file 22 to a calibration repository 40. The calibration definition file 22 contains all of the information needed to define the vehicle calibratable information of an application in the calibration repository 40. The data dictionary 20 is also capable of generating other types of reports and output files, including files that used by various industry standard software development and calibration tools.

For instance, the data dictionary is operative to generate a parameter definition file 24 having data type information for each parameter defined in an application. The parameter definition file 24 is used by at least some industry standard calibration tools. In a preferred embodiment of the invention, the parameter definition file 24 is an ASAP2 description file. The working group for the standardization of application systems (ASAP) is a European standards body initiated by the German automobile manufacturers. ASAP aims at making the tools and methods generated during the development phase of vehicle electronics compatible with each other and hence interchangeable. An ASAP2 description file is used to describe the internal data of an engine control unit and is typically used as an input to at least some calibration tools. In other words, the ASAP2 description file defines to the calibration tool how the application is configured in memory. The format of the ASAP2 description file is shown in Appendix A.

The calibration repository 40 is used to maintain vehicle calibratable information encapsulated in the object code 16. For each application, the calibration repository 40 stores its object code and multiple sets of vehicle calibratable information. Since each application may be used in different types of vehicles, multiple sets of vehicle calibratable information are maintained in a database of the calibration repository 40. Each set of vehicle calibratable information may then be associated with a different version of the application, a different vehicle model type, a different vehicle model year, a vehicle model type having different options, or some combination thereof. In this way, the vehicle calibratable information for an application can be optimized for each specific type of vehicle. It is envisioned that different sets of vehicle calibratable information may also be maintained for different calibrators or groups of calibrators.

In order to facilitate the calibration process, the calibration repository 40 is capable of generating a calibratable file 28 which is used by one of a variety of industry standard calibration tools 30. The calibratable file 28 is comprised of the object code 16 and a corresponding set of calibration values. In this way, the calibration repository 40 provides a means by which calibrators can execute the object code on a controller of a particular vehicle and optimize the vehicle calibratable information for that specific type of vehicle. Although the present invention is not limited to any particular calibration tool 30, the Inca calibration tool as provided by the Etas Company is an exemplary calibration tool. As shown in FIG. 1, the parameter definition file 24 and the calibratable file 28 each serve as an input to the calibration tool 30.

Lastly, the calibration repository 40 is able to output the production object code 26 that is embedded into the microcontrollers of the production vehicles. To do so, an appropriate set of calibration values is linked to the object code. The object code includes a memory space for the vehicle calibratable information. Each set of calibration values merely mimics the memory space as found in the object code. Therefore, the calibration repository 40 copies a set of calibration values over the memory space in the object code that corresponds to the vehicle calibratable information, thereby generating a production version of the application.

The data dictionary 20 will now be described in greater detail. In general, the data dictionary 20 stores data type information for a plurality of vehicle parameters. Each vehicle parameter is defined by its own set of attributes. Attributes which are common to all of the parameter types, include: a reference name, a software requirements name, a description, a software requirements identifier, a system identifier, a sub-system identifier, a memory type identifier, and an interface identifier. Each of these attributes are briefly described below.

The reference name is a field that contains a unique reference name for the vehicle parameter as assigned by the software developers. In contrast, the software requirements name is a field that contains a more descriptive name for the vehicle parameter as provided by the development engineers. Thus, the data dictionary provides a mapping between the reference name and the software requirements name. This mapping allows the development engineers to think in terms of their conceptual variable names while permitting the software developers to work within the software variable naming constraints as provided by the particular programming language. The description field attribute contains a brief description of the vehicle parameter.

Initially, each vehicle parameter is defined by the development engineers in a software requirements document. The software requirements document outlines the attributes and other characteristics that describe the vehicle parameter as is well known in the art. The software requirements identifier attribute is a standard numerical identifying code associated with the corresponding software requirements document.

A system identifier and a sub-system identifier are attributes which are used to help identify where the parameter originated in the vehicle. For instance, the system identifier may contain 'FUEL' for the fuel system and the subsystem identifier may contain 'J1850' for the communication sub-system.

The memory type identifier is an attribute that contains the type of memory needed for the vehicle parameter within the software development system 10. This attribute may contain, but is not limited to, one of the following valid entries: (a) non-volatile, zero random access memory (RAM) which is for vehicle parameters that need to be initialized to zero and whose value will be retained after power is removed from the microcontroller; (b) non-volatile, initialized RAM which is for vehicle parameters that need to be initialized and whose value will be retained after power is removed from the microcontroller; (c) volatile, zero RAM which is for vehicle parameters that need to be initialized to zero and whose value will not be retained after power is removed from the microcontroller; (d) volatile, initialized RAM which is for vehicle parameters that need to be initialized and whose value will not be retained after power is removed from the microcontroller; (e) calibratable memory which is for the calibratable parameters that can be viewed and altered by the calibrators via the calibrators tool set as well as downloaded into flash memory of the controller; and (f) fixed calibratable memory which is for calibratable parameters that are fixed and thus are not accessible to the calibrators.

Finally, the interface identifier is an attribute that contains the means by which interaction is achieved between software systems. This field should contain all of pertinent usage information needed by the software developers. In addition to each of these common attributes, each parameter type may have other specific attributes. These other specific attributes may include (but are not limited to) one or more of the following attributes: data type, data size, unit type, predefined valid values, ranges of valid values, equations, etc.

The data dictionary 20 supports a variety of parameter types, including, but not limited to scalars, two-dimensional tables, three-dimensional tables, registers, condition code tables, and fault code tables. Amongst the conventional parameter types, the scalar parameter is defined as either a scalar or an array. The two-dimensional look-up table is an interpolation table consisting of one independent (input) variable and one dependant (output) variable. Similarly, the two-dimensional look-up table is an interpolation table consisting of two independent (input) variables and one dependent (output) variable. The register parameter is comprised of one or more groups of bits, where each bit or group of bits has a specific meaning.

At least some of these parameter types are unique to the present invention. For instance, the condition code table is a table that maintains several conditions within the application. The purpose of the condition code table is to provide an indication of when all of the conditions are met or if any one of the conditions are not met. In addition to the common attributes, the condition code table includes the number of X breakpoints which is an attribute that contains the number of conditions in the table. The data structure for an exemplary condition code table is shown in FIG. 2.

The fault code array is another unique parameter type to the present invention. The fault code array is defined as an array where its values are individual faults that occur within the application software. The purpose of the fault code array is to capture the information necessary to manage each fault. In addition to the common attributes, the fault code array includes a fault identifier which is a pre-assigned service-designated value that is used to aid in diagnosis of the fault, and a pcode identifier which is the J2012 fault code associated with the fault entry. An exemplary data structure for the fault code array is shown in FIG. 3.

Figure 4:
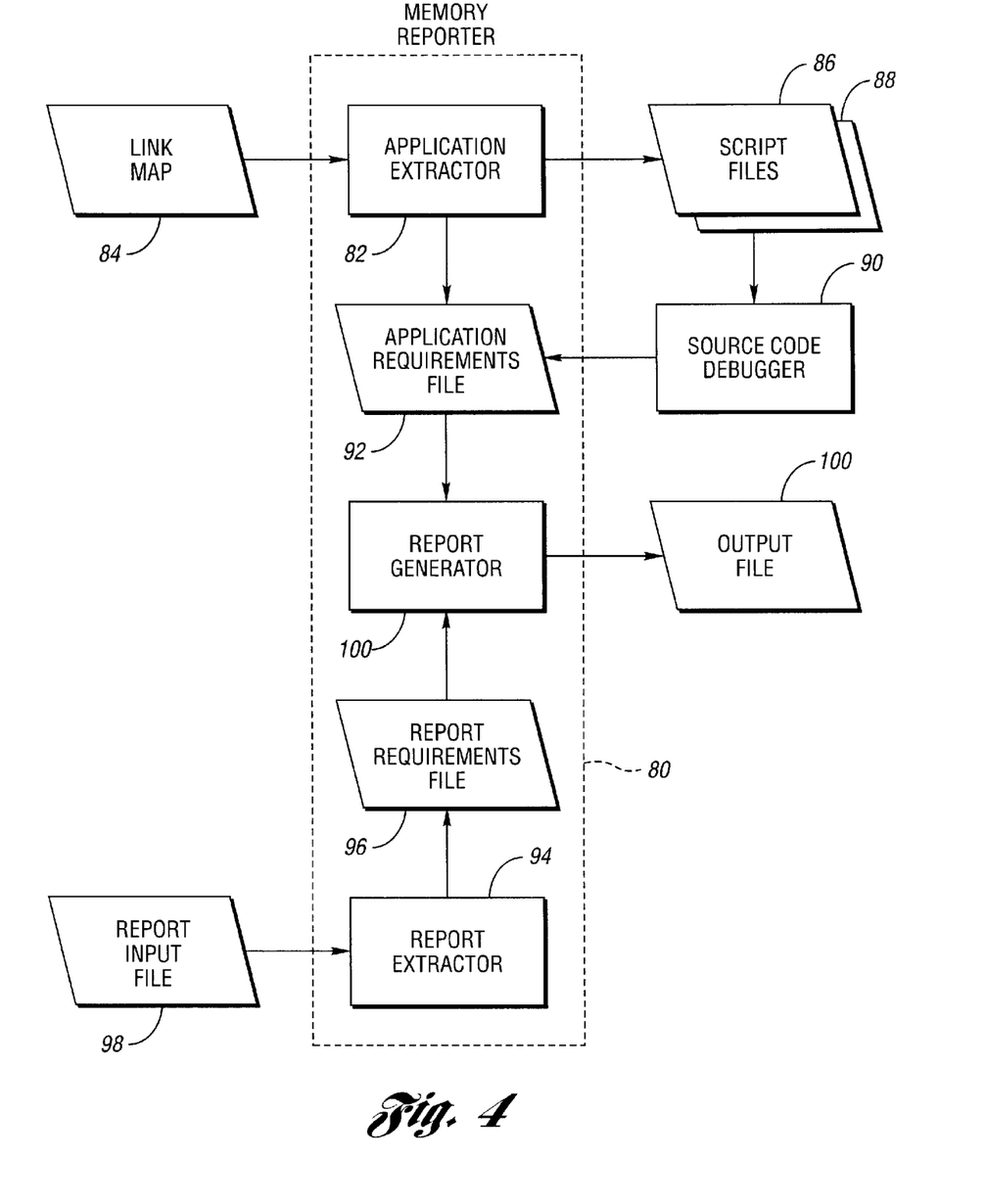
FIG. 4 is a block diagram showing a memory reporter module of the data dictionary in accordance with the present invention.

Referring to FIG. 4, the data dictionary 20 further includes a memory reporter module 80 for generating the parameter definition file, calibration file and other output files. In order to generate an output file, an application extraction module 82 first reads a compiler link map 84 that corresponds to an application. As will be apparent to one skilled in the art, a link map provides an association between a software variable name and its location in memory as assigned by the compiler. The application extraction module 82 determines which data objects from the application are defined by the compiler in the link map 84, and then builds a debug command script file 86. The debug command script file 86 is used as an input to a conventional source code debugging tool 90. The debugging tool 90 is subsequently used to further define each of the data objects associated with the application. In addition, the application extraction module 82 builds an execution script file 88 that is used by the source code debugger 90 to determine how to run the command script file 86.

The memory reporter 80 then initiates the source code debugger 90 which in turn executes the script files 86 and 88. The source code debugger 90 outputs a file containing each data item identified by the source code debugger 90. The application extraction module 82 reformats the output file provided by the source code debugger 90 in order to build an application requirements file 92. As a result, the application requirements file 92 is an array which includes a mangled data name, an unmangled data name and an address for each data item. The application requirements file 92 is sorted by address.

Next, a report extractor module 94 generates a report requirements file 96. An input report file 98 contains the requirements for the eventual output file 100. Thus, the report extractor reads 94 the input report file 98 and extracts the data items needed to generate the output file 100. The output requirements, including the data items, are sorted and then stored in the reports requirement file 96.

Figure 5:
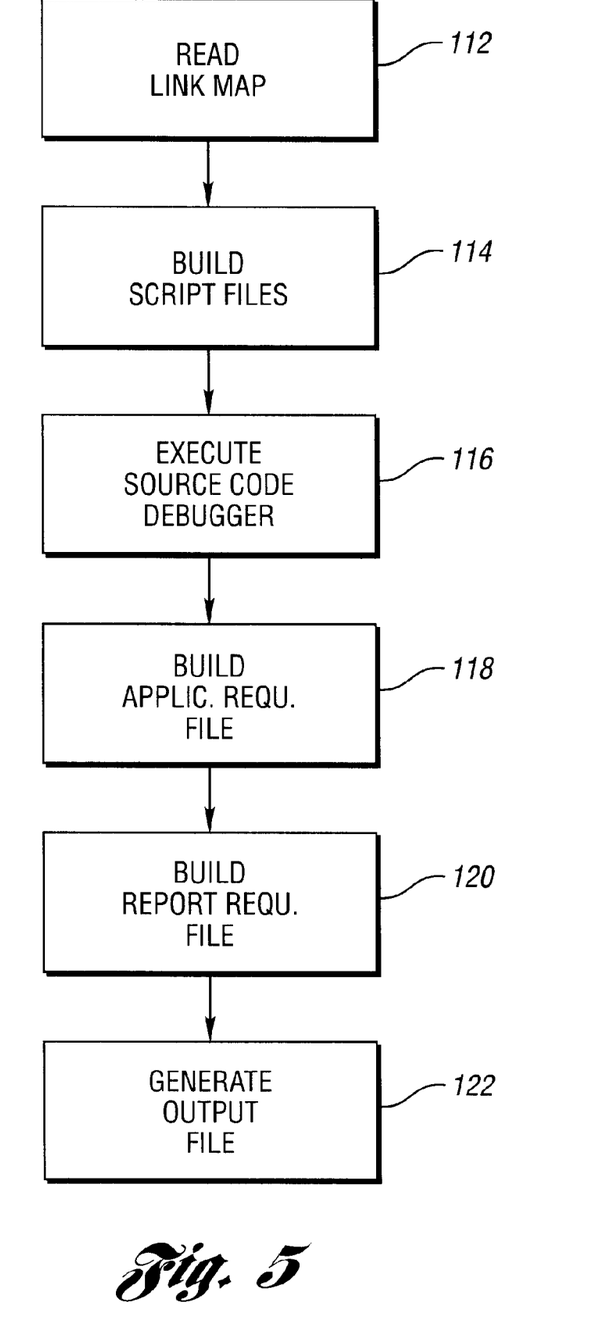
FIG. 5 is a flowchart showing how an output file is constructed using the memory reporter module of the present invention.

To generate the output file 100, an report generator module 102 reads each of the application requirements file 92 and the report requirements file 96. By reading, extracting, sorting, and formatting each of the data items contained in these two files 92 and 96, the report generator 102 is able to format the output file 100. FIG. 5 illustrates the methodology associated with memory reporter module 80.

While the above description constitutes the preferred embodiment of the invention, it will be appreciated that the invention is susceptible to modification, variation, and change without departing from the proper scope or fair meaning of the accompanying claims.

APPENDIX A

| Keyword | (*) = multiple Meaning |
|---|---|
| ASAP2_VERSION | ASAP2 version identification |
| PROJECT | Project description |
|   HEADER | Project header description |
|     PROJECT_NO | Project number |
|     VERSION | Project version number |
|       MODULE | (*) Description of the ASAP devices |
|     A2ML | (*) ASAP2-Meta-Language (interface-specific descripition data) |
|     AXIS_PTS | (*) Axis points distribution |
|       ANNOTATION | (*) Set of notes |
|       BYTE_ORDER | Byte order of axis points |
|       DEPOSIT | Absolute or difference axis points |
|       DISPLAY_IDENTIFIER | Optional display name |
|       FORMAT | Display format of axis points |
|       FUNCTION_LIST | Function orientation |
|       IF_DATA | (*) Interface-specific description data |

APPENDIX A-continued

| Keyword | (*) = multiple Meaning |
|---|---|
| READ_ONLY | 'Read Only' attribute |
| GUARD_RAILS | Indicates the use of guardrails |
| CHARACTERISTIC | (*) Adjustable objects |
|   ANNOTATION | (*) Description |
|   AXIS_DESCR | (*) Axis description |
|     ANNOTATION | (*) Set of notes |
|     AXIS_PTS_REF | Reference to axis point distribution |
|     BYTE_ORDER | Byte order of axis points |
|     DEPOSIT | Absolute or difference axis points |
|     FIX_AXIS_PAR | Fixed axis parameters |
|     FIX_AXIS_PAR_DIST | Fixed axis parameters (variant) |
|     FIX_AXIS_PAR_LIST | Fixed axis values |
|     FORMAT | Display format of axis points |
|     MAX_GRAD | Maximum gradient with respect to this axis |
|     MONOTONY | Monotony with respect to this axis |
|     READ_ONLY | 'Read Only' attribute |
|   BIT_MASK | Bit mask to decode single-bit values |
|   BYTE_ORDER | Byte order |
|   COMPARISON_QUANTITY | Comparison quantity |
|   DISPLAY_IDENTIFIER | Optional display name |
|   EXTENDED_LIMITS | Extended limits, e.g. hard limits |
|   FORMAT | Display format of values |
|   FUNCTION_LIST | Function orientation |
|   IF_DATA | (*) Interface-specific description data |
|   NUMBER | Number of ASCII characters or fixed values |
|   READ_ONLY | 'Read Only' attribut |
| COMPU_METHOD | (*) Conversion method |
|   COEFFS | Coefficients for fractional rational function |
|   COMPU_TAB_REF | Reference to conversion table |
|   FORMULA | Conversion formula |
|     FORMULA_INV | Invers conversion formula |
| COMPU_TAB | (*) Conversion table |
| COMPU_VTAB | (*) Verbal conversion table |
|   DEFAULT_VALUE | Default output string |
| COMPU_VTAB_RANGE | (*) Description of range based verbal conversion tables |
| FRAME | Frame |
|   FRAME_MEASUREMENT | Frame measurement objects |
|   IF_DATA | (*) Interface-specific description data |
| FUNCTION | (*) Function description |
|   ANNOTATION | (*) Set of notes |
|   DEF_CHARACTERISTIC | Defined adjustable objects |
|   IN_MEASUREMENT | Input quantity |
|   LOC_MEASUREMENT | Local quantity |
|   OUT_MEASUREMENT | Output quantity |
|   REF_CHARACTERISTIC | Referenced adjustable objects |
|   SUB_FUNCTION | Subfunction of respectiv function |
| GROUP | (*) Declaration of groups |
|   ANNOTATION | (*) Set of notes |
|   ROOT | Flag for root node |
|   REF_CHARACTERISTIC | Reference to characteristic objects |
|   REF_MEASUREMENT | Reference to measurement objects |
|   FUNCTION | Function |
|   SUB_GROUP | Sub group |
| IF_DATA | (*) Interface-specific description data |
|   SOURCE | (*) Acquisition mode |
| MEASUREMENT | (*) Measurement object |
|   ANNOTATION | (*) Set of notes |
|   ARRAY_SIZE | Array size of measurement objects |
|   BIT_MASK | Bit mask to decode single-bit values |
|   BIT_OPERATION | Bit operation |
|     LEFT_SHIFT | Number of bit positions to shift left |
|     RIGHT_SHIFT | Number of bit positions to shift right |
|     SIGN_EXTEND | sign extension for measurement data |
|   BYTE_ORDER | Byte order of measurement object |
|   DISPLAY_IDENTIFIER | Optional display name |
|   FORMAT | Display format of measurement object |
|   FUNCTION_LIST | Function orientation |
|   IF_DATA | (*) Interface-specific description data |
|     MULTIPLEX (ASAP1B_CAN) | Standard-ASAP1B_CAN-description: Multiplex mode |
|   MAX_REFRESH | Refresh rate in the control unit |
|   READ_WRITE | 'Writeable' |
|   VIRTUAL | Virtual measurement |
| MOD_COMMON | Module-wide (ECU specific) valid definitions |
|   BYTE_ORDER | Byte order |
|   DATA_SIZE | Data size in bits |
|   DEPOSIT | Standard deposit mode for axis |
|   S_REC_LAYOUT | Reference to the standard record layout |

APPENDIX A-continued

| Keyword | (*) = multiple Meaning |
|---|---|
| MOD_PAR | Control unit management data |
|   ADDR_EPK |   Address of EPROM identifier |
|   CPU_TYPE |   CPU |
|   CUSTOMER |   Firm or customer |
|   CUSTOMER_NO |   Customer number |
|   ECU |   Control unit |
|   EPK |   EPROM identifier |
|   MEMORY_LAYOUT |   (*) Memory layout |
|     IF_DATA |   (*) Interface-specific description data |
|   MEMORY_SEGMENT |   (*) Memory segment |
|     IF_DATA |   (*) Interface-specific description data |
|   NO_OF_INTERFACES |   Number of interfaces |
|   PHONE_NO |   Phone number of application engineer responsible |
|   SUPPLIER |   Manufacturer or supplier |
|   SYSTEM_CONSTANT |   (*) System-defined constants |
|   USER |   User |
|   VERSION |   Module-specific version identifier |
| RECORD_LAYOUT | (*) Description of the record layout |
|   AXIS_PTS_X |   X axis points |
|   AXIS_PTS_Y |   Y axis points |
|   DIST_OP_X |   X axis: parameter 'distance' for fixed characteristics |
|   DIST_OP_Y |   Y axis: parameter 'distance' for fixed characteristics |
|   FIX_NO_AXIS_PTS_X |   Fixed number of X axis points |
|   FIX_NO_AXIS_PTS_Y |   Fixed number of Y axis points |
|   FNC_VALUES |   Table values |
|   IDENTIFICATION |   Identification |
|   NO_AXIS_PTS_X |   Number of X axis points |
|   NO_AXIS_PTS_Y |   Number of Y axis points |
|   OFFSET_X |   X axis: parameter 'offset' for fixed characteristics |
|   OFFSET_Y |   Y axis: parameter 'offset' for fixed characteristics |
|   RESERVED |   (*) Parameter is skipped (not interpreted) |
|   RIP_ADDR_W |   Table value: Address 'result of interpolation' |
|   RIP_ADDR_X |   X axis: Address 'result of interpolation' |
|   RIP_ADDR_Y |   Y axis: Address 'result of interpolation' |
|   SHIFT_OP_X |   X axis: parameter 'shift' for fixed characteristics |
|   SHIFT_OP_Y |   Y axis: parameter 'shift' for fixed characteristics |
|   SRC_ADDR_X |   X axis: Address of input quantity |
|   SRC_ADDR_Y |   Y axis: Address of input quantity |
| USER_RIGHTS | (*) Groups with constitute access rights |
|   REF_GROUP |   (*) List of referenced groups |
|   READ_ONLY |   Read only |
| VARIANT_CODING | Variant coding |
|   VAR_CHARACTERISTIC |   (*) Definition of variant coded adjustable objects |
|   VAR_MEASUREMENT |   Measurement object which indicates criterion value |
|   VAR_CRITERION |   (*) Definition of variant criterion |
|   VAR_ADDRESS |   Adjustable objects address list (start address of variants) |
|   VAR_FORBIDDEN_COMB |   Forbidden combinations of different variants |
|   VAR_NAMING |   Naming of variant coded adjustable objects |
|   VAR_SEPARATOR |   Separator of ajustable objects names |

We claim:

1. A computer-implemented software development system for constructing applications that are embedded in one or more microcontrollers of a motor vehicle, comprising:

a data dictionary having a memory reporter module, said data dictionary storing data type information for a plurality of vehicle parameters and said memory reporter module being operative to generate a parameter definition file and a calibration definition file, said parameter definition file having data type information for each vehicle parameter in a first application and said calibration definition file having information for use in a calibration data structure for storing calibratable vehicle information wherein said memory reporter module reads a report input file to selectively extract data type information for creating said parameter definition file and said calibration definition file;

a calibration module connected to said calibration data structure for generating a calibratable file for said first application, said calibratable file having calibratable vehicle information and controller executable instructions for said first application; and a calibration tool using said parameter definition file and said calibratable file to calibrate said first application in relation to the motor vehicle.

2. The software development system of claim 1 wherein said controller executable instructions for said first application are embedded in a microcontroller of the motor vehicle and said calibration tool being operative to modify the calibratable vehicle information of said first application in relation to the motor vehicle.

3. The software development system of claim 2 wherein said calibration module receiving the modified calibratable vehicle information from said calibration tool and being operative to generate controller executable instructions using the modified calibratable vehicle information.

4. The software development system of claim 1 wherein said parameter definition file is further defined as an ASAP2 description file.

5. The software development system of claim 1 wherein the data type information for each vehicle parameter includes a reference name, a software requirements name, a description, a software requirements identifier, a system identifier, a sub-system identifier, a memory type identifier and an interface identifier.

6. The software development system of claim 1 wherein said data dictionary supports a plurality of vehicle parameter types, said vehicle parameter types being selected from the group having a scalar, a two-dimensional table, a three-dimensional table, a register, a condition code table and a fault code table.

* * * * *